US008393733B2

(12) United States Patent
Wooley et al.

(10) Patent No.: US 8,393,733 B2
(45) Date of Patent: Mar. 12, 2013

(54) LENSES FOR THE CORRECTION OF PRESBYOPIA AND METHODS OF DESIGNING THE LENSES

(75) Inventors: C. Benjamin Wooley, Jacksonville, FL (US); James W. Haywood, Orange Park, FL (US); Ronald Clark, Jacksonville, FL (US); Thomas Karkkainen, Jacksonville, FL (US); Susan W. Neadle, Jacksonville, FL (US); Sheila B. Hickson-Curran, Ponte Vedra Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 196 days.

(21) Appl. No.: 12/789,347

(22) Filed: May 27, 2010

(65) Prior Publication Data
US 2010/0302505 A1    Dec. 2, 2010

Related U.S. Application Data

(62) Division of application No. 12/058,817, filed on Mar. 31, 2008, now Pat. No. 7,753,521.

(51) Int. Cl.
*G02C 7/04* (2006.01)
*G02C 7/00* (2006.01)

(52) U.S. Cl. ......... 351/159.04; 351/159.02; 351/159.05; 351/159.06; 351/159.22; 351/159.23; 351/159.41

(58) Field of Classification Search ............... 351/160 H, 351/160 R, 161, 165, 168, 176, 177, 205, 351/219, 159.02, 159.04–159.06, 159.19, 351/159.21–159.23, 159.28, 159.34, 159.41, 351/159.51
See application file for complete search history.

(56) References Cited

U.S. PATENT DOCUMENTS

| 4,580,882 | A |   | 4/1986  | Nuchman et al.        |
|-----------|---|---|---------|-----------------------|
| 4,738,521 | A | * | 4/1988  | Volk ............... 351/205 |
| 4,861,152 | A |   | 8/1989  | Vinzia et al.         |
| 4,898,461 | A |   | 2/1990  | Portney               |
| 5,002,382 | A |   | 3/1991  | Seidner               |
| 5,024,517 | A |   | 6/1991  | Seidner               |
| 5,057,578 | A |   | 10/1991 | Spinelli              |
| 5,125,729 | A |   | 6/1992  | Mercure               |
| 5,166,711 | A |   | 11/1992 | Portney               |
| 5,181,053 | A |   | 1/1993  | Brown                 |
| 5,225,858 | A |   | 7/1993  | Portney               |
| 5,270,744 | A |   | 12/1993 | Portney               |
| 5,278,592 | A |   | 1/1994  | Marie et al.          |
| 5,314,960 | A |   | 5/1994  | Spinelli et al.       |

(Continued)

FOREIGN PATENT DOCUMENTS

DE    3246306 A1    6/1984
EP     225098 A2    6/1987

(Continued)

OTHER PUBLICATIONS

PCT International Search Report . PCT/2009/038960 date of mailing Jul. 23, 2009.

(Continued)

*Primary Examiner* — Loha Ben

(57) ABSTRACT

The invention provides methods for designing contact lenses and contact lenses designed according to the method, which lenses provide an improved method for presbyopia correction compared to conventional lenses and methods. It is a discovery of the invention that improved performance and reduced design time can be obtained by using lens pairs that act synergistically to provide the lens wearer with good binocularity and consistent performance in near, intermediate and distance vision.

1 Claim, 4 Drawing Sheets

U.S. PATENT DOCUMENTS

| | | | |
|---|---|---|---|
| 5,349,396 A | 9/1994 | Roffman et al. | |
| 5,371,147 A | 12/1994 | Spinelli et al. | |
| 5,443,507 A | 8/1995 | Jacobi | |
| 5,448,312 A | 9/1995 | Roffman et al. | |
| 5,485,228 A | 1/1996 | Roffman et al. | |
| 5,517,260 A | 5/1996 | Glady et al. | |
| 5,521,656 A | 5/1996 | Portney | |
| 5,526,071 A | 6/1996 | Seidner et al. | |
| 5,540,410 A | 7/1996 | Lust et al. | |
| 5,541,678 A * | 7/1996 | Awanohara et al. | 351/159.41 |
| 5,574,518 A | 11/1996 | Mercure | |
| 5,619,289 A | 4/1997 | Seidner et al. | |
| 5,652,638 A | 7/1997 | Roffman et al. | |
| 5,657,108 A | 8/1997 | Portney | |
| 5,682,223 A | 10/1997 | Menezes et al. | |
| 5,691,797 A | 11/1997 | Seidner et al. | |
| 5,715,031 A | 2/1998 | Roffman et al. | |
| 5,754,270 A | 5/1998 | Rehse et al. | |
| 5,796,462 A | 8/1998 | Roffman et al. | |
| 5,798,817 A | 8/1998 | de Carle | |
| 5,805,260 A | 9/1998 | Roffman et al. | |
| 5,812,235 A | 9/1998 | Seidner et al. | |
| 5,812,236 A | 9/1998 | Seidner et al. | |
| 5,815,239 A | 9/1998 | Chapman et al. | |
| 5,835,187 A | 11/1998 | Martin | |
| 5,835,192 A | 11/1998 | Roffman et al. | |
| 5,847,802 A * | 12/1998 | Menezes et al. | 351/161 |
| 5,877,839 A | 3/1999 | Portney | |
| 5,898,473 A | 4/1999 | Seidner et al. | |
| 5,929,969 A * | 7/1999 | Roffman | 351/159.41 |
| 5,975,694 A | 11/1999 | Vayntraub | |
| 6,007,201 A | 12/1999 | Wada et al. | |
| 6,030,077 A | 2/2000 | Sawano et al. | |
| 6,116,735 A | 9/2000 | Wada | |
| 6,179,420 B1 * | 1/2001 | Roffman et al. | 351/161 |
| 6,186,625 B1 | 2/2001 | Portney | |
| 6,199,982 B1 * | 3/2001 | Oyama et al. | 351/159.02 |
| 6,244,709 B1 | 6/2001 | Vayntraub et al. | |
| 6,260,966 B1 | 7/2001 | Sawano et al. | |
| 6,357,876 B1 | 3/2002 | Oyama et al. | |
| 6,364,483 B1 | 4/2002 | Grossinger et al. | |
| 6,409,340 B1 | 6/2002 | Portney | |
| 6,428,573 B2 | 8/2002 | Barnett | |
| 6,457,826 B1 | 10/2002 | Lett | |
| 6,474,814 B1 | 11/2002 | Griffin | |
| 6,511,178 B1 * | 1/2003 | Roffman et al. | 351/161 |
| 6,527,389 B2 | 3/2003 | Portney | |
| 6,537,317 B1 | 3/2003 | Steinert et al. | |
| 6,547,822 B1 | 4/2003 | Lang | |
| 6,554,425 B1 * | 4/2003 | Roffman et al. | 351/177 |
| 6,557,998 B2 | 5/2003 | Portney | |
| 6,576,011 B2 | 6/2003 | Portney | |
| 6,576,012 B2 | 6/2003 | Lang | |
| 6,582,076 B1 | 6/2003 | Roffman et al. | |
| 6,685,315 B1 | 2/2004 | De Carle | |
| 6,709,102 B2 | 3/2004 | Duppstadt | |
| 6,733,125 B2 | 5/2004 | Bérubé et al. | |
| 6,802,606 B2 * | 10/2004 | Roffman et al. | 351/161 |
| 6,808,262 B2 | 10/2004 | Chapoy et al. | |
| 6,814,439 B2 | 11/2004 | Portney | |
| 6,824,563 B2 | 11/2004 | Lang | |
| 6,846,892 B2 | 1/2005 | Kindt-Larsen et al. | |
| 6,874,887 B2 | 4/2005 | Tyson | |
| 6,929,366 B2 | 8/2005 | Perel et al. | |
| 7,033,023 B2 * | 4/2006 | Steele et al. | 351/169 |
| 7,073,906 B1 | 7/2006 | Portney | |
| 7,261,412 B2 | 8/2007 | Somani et al. | |
| 7,290,877 B1 * | 11/2007 | Wu | 351/159.79 |
| 7,503,652 B2 * | 3/2009 | Menezes | 351/161 |
| 7,677,726 B2 * | 3/2010 | Watanabe | 351/177 |
| 7,753,521 B2 | 7/2010 | Wooley et al. | |
| 7,926,940 B2 * | 4/2011 | Blum et al. | 351/163 |
| 2001/0033363 A1 | 10/2001 | Chateau et al. | |
| 2002/0036748 A1 | 3/2002 | Chapoy et al. | |
| 2002/0143394 A1 | 10/2002 | Lang | |
| 2003/0045931 A1 | 3/2003 | Lang | |
| 2003/0123024 A1 | 7/2003 | Dunn | |
| 2004/0156014 A1 | 8/2004 | Piers | |
| 2004/0201821 A1 | 10/2004 | Tyson | |
| 2005/0041203 A1 | 2/2005 | Lindacher et al. | |
| 2007/0030444 A1 | 2/2007 | Chauveau et al. | |
| 2009/0059167 A1 | 3/2009 | Wooley et al. | |

FOREIGN PATENT DOCUMENTS

| | | |
|---|---|---|
| EP | 225098 A3 | 1/1989 |
| EP | 741314 A2 | 11/1996 |
| EP | 803076 A1 | 10/1997 |
| EP | 741314 A3 | 10/1998 |
| EP | 803076 B1 | 4/1999 |
| EP | 1055145 A1 | 11/2000 |
| EP | 1055145 B1 | 11/2000 |
| EP | 1070978 A1 | 1/2001 |
| EP | 1070978 B1 | 1/2001 |
| EP | 1070978 B1 | 7/2003 |
| EP | 741314 B1 | 2/2005 |
| EP | 1055145 B1 | 10/2005 |
| JP | 3195386 A | 8/1991 |
| WO | WO 92/22264 A1 | 12/1992 |
| WO | WO 9222264 A1 | 12/1992 |
| WO | WO 9621878 A1 | 7/1996 |
| WO | WO 0008516 A1 | 2/2000 |
| WO | WO 0008516 A9 | 8/2000 |
| WO | WO 0135880 A1 | 5/2001 |
| WO | WO 0153878 A1 | 7/2001 |
| WO | WO 0184216 A1 | 11/2001 |
| WO | WO 2005001553 A1 | 1/2005 |
| WO | WO 2005004089 A1 | 1/2005 |
| WO | WO 2005040895 A1 | 5/2005 |
| WO | WO 2006005377 A1 | 1/2006 |
| WO | WO 2006053776 A1 | 5/2006 |
| WO | WO 2006056847 A1 | 6/2006 |

OTHER PUBLICATIONS

D.A. Hough, "Designing a New Range of Bifocal Contact Lenses", Optical World, Jun. 1991, p. 12, vol. 20, No. 140, Enfield, England.
George T. Bauer, "Longitudinal Spherical Aberration of Soft Contact Lenses", International Contact Lens Clinic, May/Jun. 1979, pp. 72-79.
Notice of Allowance for U.S. Appl. No. 12/058,817 (mailed Apr. 19, 2010).

* cited by examiner

Monocular Distance Ratio, D for each lens, A,B and C: $d_A > d_B > d_C$.
Monocular Near Ratio, N for each lens A, B, and C: $n_A < n_B < n_C$ Monocular Distance Ratio, D for each lens, A,B and C: $d_A > d_B > d_C$.
Monocular Near Ratio, N for each lens A,B, and C: $n_A < n_B < n_C$ Monocular Distance Ratio, D for each lens, A,B and C: $d_A > d_B > d_C$.
Monocular Near Ratio, N for each lens A,B, and C: $n_A < n_B < n_C$

LENSES FOR THE CORRECTION OF PRESBYOPIA AND METHODS OF DESIGNING THE LENSES

CROSS REFERENCE TO RELATED APPLICATIONS

This application is a divisional of U.S. application Ser. No. 12/058,817, filed Mar. 31, 2008, now U.S. Pat. No. 7,753,521, which claims priority thereto under 35 U.S.C. 121 and of which is hereby incorporated by reference in its entirety.

FIELD OF THE INVENTION

The invention relates to ophthalmic lenses useful for the correction of presbyopia. In particular, the invention provides sets of contact lenses from which pairs may be selected, and lens pairs, to be worn by an individual to correct presbyopia.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is absent.

Among the methods used to correct for the eye's failure to accommodate is a method known as mono-vision in which a single vision lens for correction of distance vision is used in the lens wearer's dominant eye and a single vision lens for correction of near vision is used in the non-dominant eye. Monovision is disadvantageous because it results in a loss of stereopsis. Another known method for correction of presbyopia is to use bifocal or multifocal contact lenses in both of the individual's eyes. Use of bifocal or multifocal lenses in both eyes results in a reduction of image contrast and resolution compared to mono-vision. Yet another method of treating presbyopia is to place a bifocal or multifocal lens in one eye and a single vision lens in the other eye. The disadvantage in using this method is in the large number of lenses that must be considered in order to provide the individual with satisfactory lens performance.

DETAILED DESCRIPTION OF THE INVENTION AND PREFERRED EMBODIMENTS

Figure 1:
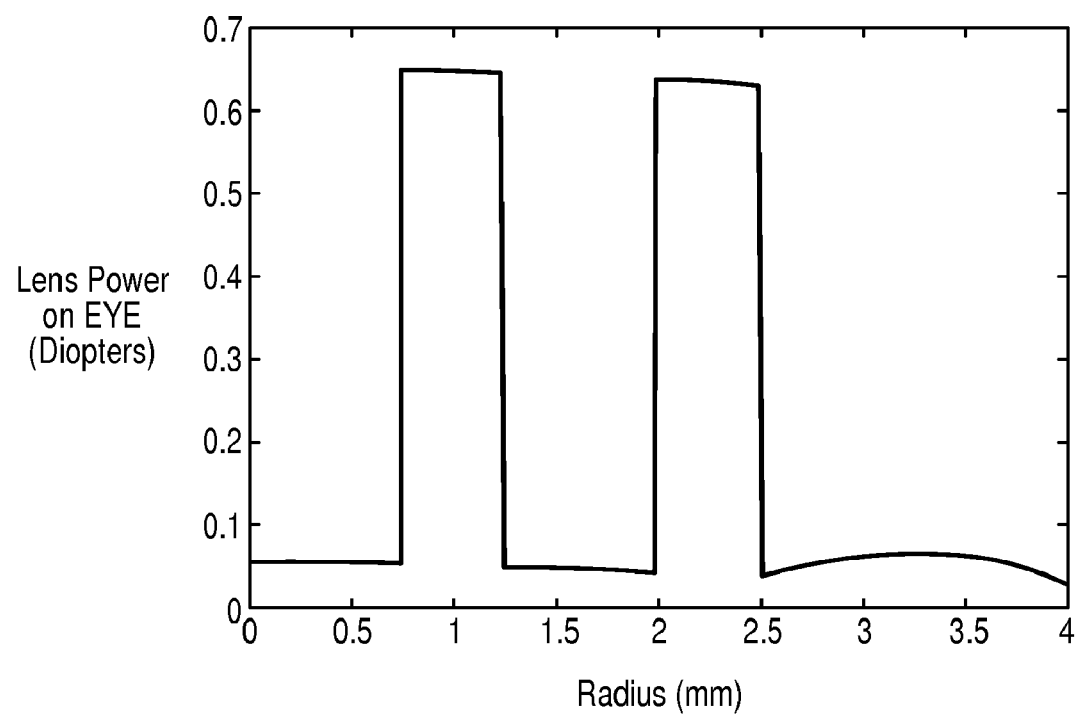
FIG. 1 is a graph in which is depicted a power profile.

The invention provides methods for designing contact lenses, contact lenses designed according to the method, and methods for producing the lens, which lenses provide an improved method for presbyopia correction compared to conventional lenses and methods. It is a discovery of the invention that improved performance and reduced design time can be obtained by using lens pairs that act synergistically to provide the lens wearer with good binocularity and consistent performance in near, intermediate and distance vision.

In one embodiment, the invention provides a lens pair, comprising, consisting essentially of, and consisting of a first lens and a second lens that satisfy the following relationships:

$$\overline{D} \geq -0.14 \times Rx\_add + 0.84$$

$$\overline{N} \geq -0.08 \times Rx\_add + 0.64$$

$$\overline{\Delta d} \leq 0.2$$

$$\overline{\Delta n} \leq 0.2$$

wherein $\overline{D}$ is a mean value of a binocular weighted distance ratio for pupil diameters from 2.5 to 6 mm;
Rx_add is the additional power in diopters added to the distance prescription to provide near vision correction for an individual;
$\overline{N}$ is a mean value of a binocular weighted near ratio for pupil diameters from 2.5 to 6 mm;
$\overline{\Delta d}$ is a mean value for a disparity at distance vision between the first and second lens for pupil diameters of about 2.5 to 6 mm; and
$\overline{\Delta n}$ is a mean value for a disparity at near vision between the first and second lens for pupil diameters of about 3.5 to about 6 mm.

In a preferred embodiment, the lens pair is selected from a set of lenses having a range of add powers of from about 0.75 to about 2.50 diopters.

The invention also provides a method for correcting presbyopia comprising, consisting essentially of, and consisting of: a.) providing two or more lenses, each lens having a power profile different from that of each of the other lenses; and b.) selecting from the lenses provided in step a.) a first lens and a second lens to form a lens pair, wherein the first and second lens pair satisfy the following relationships:

$$\overline{D} \geq -0.14 \times Rx\_add + 0.84$$

$$\overline{N} \geq -0.08 \times Rx\_add + 0.64$$

$$\overline{\Delta d} \leq 0.2$$

$$\overline{\Delta n} \leq 0.2$$

In still another embodiment, the invention provides a set of lenses comprising, consisting essentially of, and consisting of a first lens having a mean value of a monocular weighted distance ratio $d_A$ and a mean value of a monocular weighted near ratio $n_A$, a second lens having a mean value of a monocular weighted distance ratio $d_B$ and a mean value of a monocular weighted near ratio $n_B$, and a third lens having a mean value of a monocular weighted distance ratio $d_C$ and a mean value of a monocular weighted near ratio $n_C$, wherein each of the first, second and third lenses have a power profile that is different from each of the other lenses and wherein $d_A > d_B > d_C$ and $n_A < n_B < n_C$. In a preferred embodiment, the set of lenses is a set of three lenses.

It is a discovery of the invention that superior performance, compared to conventional multifocal lenses, may be achieved by an individual wearing a pair of lenses that satisfy the following relationships:

$$\overline{D} \geq -0.14 \times Rx\_add + 0.84$$

$$\overline{N} \geq -0.08 \times Rx\_add + 0.64$$

$$\overline{\Delta d} \leq 0.2$$

$$\overline{\Delta n} \leq 0.2$$

wherein $\overline{D}$ is a mean value of a binocular weighted distance ratio for pupil diameters from 2.5 to 6 mm;

Rx_add is the additional power in diopters added to the distance prescription to provide near vision correction for an individual;

$\overline{N}$ is a mean value of a binocular weighted near ratio for pupil diameters from 2.5 to 6 mm;

$\overline{\Delta d}$ is a mean value for a disparity at distance vision between the lenses for pupil diameters of about 2.5 to 6 mm; and $\overline{\Delta n}$ is a mean value for a disparity at near vision between the lenses for pupil diameters of about 3.5 to about 6 mm The binocular weighted distance ratio ("D") is the maximum of the weighted distance ratio of the dominant eye ("$d_1$") and the weighted distance ratio of the non-dominant eye ("$d_2$") or D=max ($d_1$, $d_2$). The weighted near ratio ("N") is the maximum of the weighted near ratio of the dominant eye ("$n_1$") and the weighted near ratio of the non-dominant eye ("$n_2$") or N=max ($n_1$, $n_2$). For purposes of the invention, by "dominant eye" is meant the eye that is determined by the eye care practitioner to be the eye the correction for which should be optimized for distance vision and the non-dominant eye refers to eye the correction for which should be optimized for near vision.

The monocular weighted distance and near ratios may be calculated for various pupil sizes for each eye and are measures of how well the power at any given lens radius meets the distance and near requirements, respectively, of the lens wearer. The ratios also measure how well a single lens may be expected to perform relative to ideal given the wearer's sphere and add prescriptions. The weighted distance and near ratios will have a range of values from 0 to 1.0, with 0 meaning that no benefit is provided at the required distance for the lens wearer and 1.0 meaning that the lens fully corrects the wearer at the distance. For rotationally symmetric power profiles, the monocular weighted distance ratio may be calculated by integrating over the lens radius to give:

$$d(R) = \frac{\int_0^R [1 - \tanh(0.5 * |P(r) - \text{Rx\_sphere}|)] r dr}{\int_0^R r dr} \quad (1)$$

wherein R is a radius of the pupil;

Rx_sphere is a sphere prescription power in diopters for the eye that the monocular weighted ratio is being calculated;

tanh is the hyperbolic tangent; and

P(r) is the power of the lens plus eye given by the following equation:

$$P(r) = P_{CL}(r) + SA_{eye} * r^2 + F \quad (II)$$

wherein $SA_{eye}$ is the spherical aberration of the eye and preferably is 0.1 diopters/mm$^2$;

F is the lens fit, meaning the change from nominal, in diopters;

r is a radial distance from the center of the contact lens; and $P_{CL}(r)$ is the radial power distribution, or power profile, for the contact lens. For a specific design, the power distribution is provided as a series of $P_{CL}(r)$ in increments of 0.25 diopters.

The radial power distribution, or power profile, ($P_{CL}(r)$) of the lens is the axial power of the lens in air and may be calculated from the surface shapes, thickness and index of refraction of the lens. The radial power distribution may also be measured, most accurately, by measuring the wavefront with an interferometer from which the wavefront can be determined FIG. 1 is an example of a radial power distribution, or power profile. As shown, the horizontal, or x, axis is the radial distance from the geometric center of the lens. The vertical, or y, axis is the lens power added to the eye power at each radial position.

The monocular weighted near ratio may be calculated by integrating over the lens radius to give:

$$n(R) = \frac{\int_0^R [1 - \tanh(0.5 * |P(r) - \text{Rx\_sphere} - \text{Rx\_add}|)] r dr}{\int_0^R r dr} \quad (III)$$

wherein R, is the radius of the pupil;

Rx_sphere is a sphere prescription power in diopters for the eye that the monocular weighted ratio is being calculated;

tanh is the hyperbolic tangent;

P(r) is the power of the contact lens plus eye given by Equation II; and

Rx_add is an additional power in diopters added to a distance prescription to provide near vision correction for the individual.

For non-rotationally symmetric power profiles, the monocular weighted distance ratio may be calculated by integrating over the lens radius to give:

$$d(R) = \frac{\int_0^{2\pi} \int_0^R [1 - \tanh(0.5 * |P(r, \Phi) - \text{Rx\_sphere}|)] r dr d\Phi}{\int_0^{2\pi} \int_0^R r dr d\Phi} \quad (IV)$$

wherein R, Rx_sphere, tanh and P(r) are as set forth above: and $\Phi$ is a polar angle.

The monocular weighted near ratio for non-rotationally symmetric power profiles may be calculated by integrating over the lens radius to give:

$$n(R) = \frac{\int_0^{2\pi} \int_0^R [1 - \tanh(0.5 * |P(r, \Phi) - \text{Rx\_sphere} - \text{Rx\_add}|)] r dr d\Phi}{\int_0^{2\pi} \int_0^R r dr d\Phi} \quad (V)$$

For symmetrical diffractive lenses, the monocular weighted distance ratio may be calculated by integrating over the lens radius to give:

$$d(R) = \frac{\int_0^R \left[1 - \tanh\left(0.5 * \left|\sum_m \epsilon_m * P_m(r) - Rx\right|\right)\right] r dr}{\int_0^R r dr} \quad (VI)$$

wherein m is the diffractive order;

$P_m(r)$ is the power profile into order m;

$\epsilon_m$ is the diffractive efficiency into order m; and $$\sum_m \epsilon_m \text{ is } 1.$$

Equations II, IV and V may be similarly modified.

Using the binocular weighted distance ratio D and binocular weighted near ratio N, the best performance for a lens pair for correcting presbyopia may be obtained using lenses incorporating spherical aberration correction with the lens in the dominant eye fit to the prescription sphere power and the non-dominant eye lens fit to the sphere power plus the prescribed add power. In this case, D and N both equal 1.0. Although this pair provides optimum performance in individuals who can tolerate disparity between the eyes at distance and near, for those individuals who cannot tolerate the disparity, the measurement of the lenses' performance must be expanded to account for the disparity.

The disparity at distance, Δd, and at near, Δn, may be defined as:

$$\Delta d = |d_1 - d_2|$$

$$\Delta n = |n_1 - n_2|$$

The disparity measurements correlate with visual comfort, stereopsis, and visual artifacts.

In a preferred embodiment, a set of three lenses is provided, each lens having a power profile different from that of each of the other lenses and the lenses satisfying the following relationships:

$$\overline{D} \geq -0.14 \times Rx\_add + 0.84$$

$$\overline{N} \geq -0.08 \times Rx\_add + 0.64$$

$$\overline{\Delta d} \leq 0.2$$

$$\overline{\Delta n} \leq 0.2$$

Figure 2:
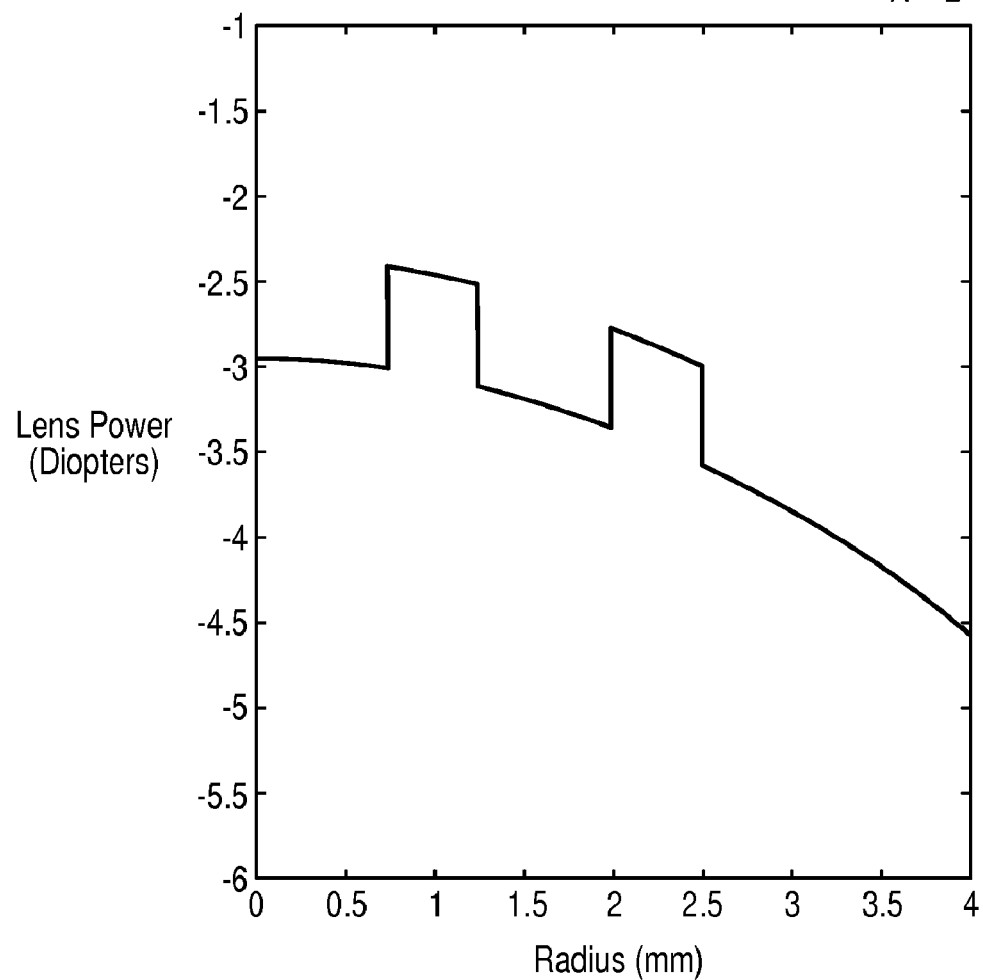
FIG. 2 is a graph in which is depicted a power profile of a lens of the invention.
Figure 3:
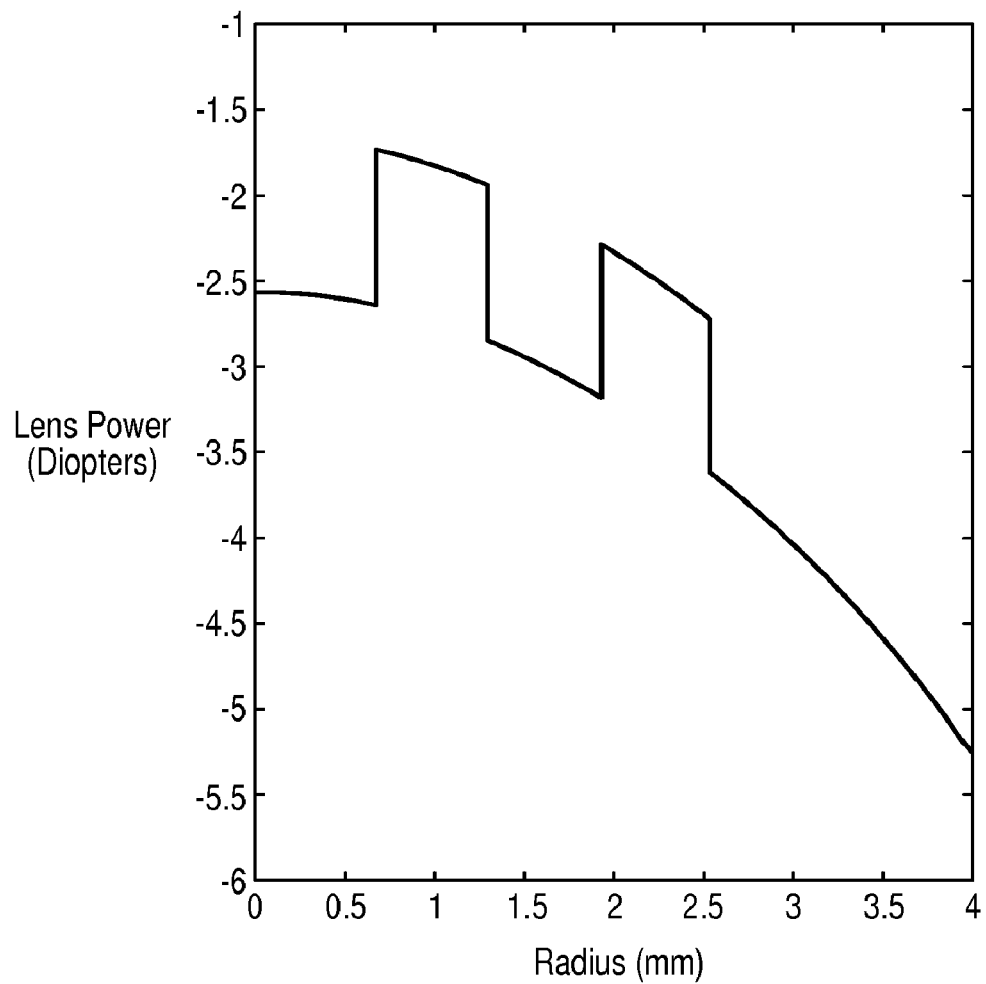
FIG. 3 is a graph in which is depicted a power profile of a lens of the invention.
Figure 4:
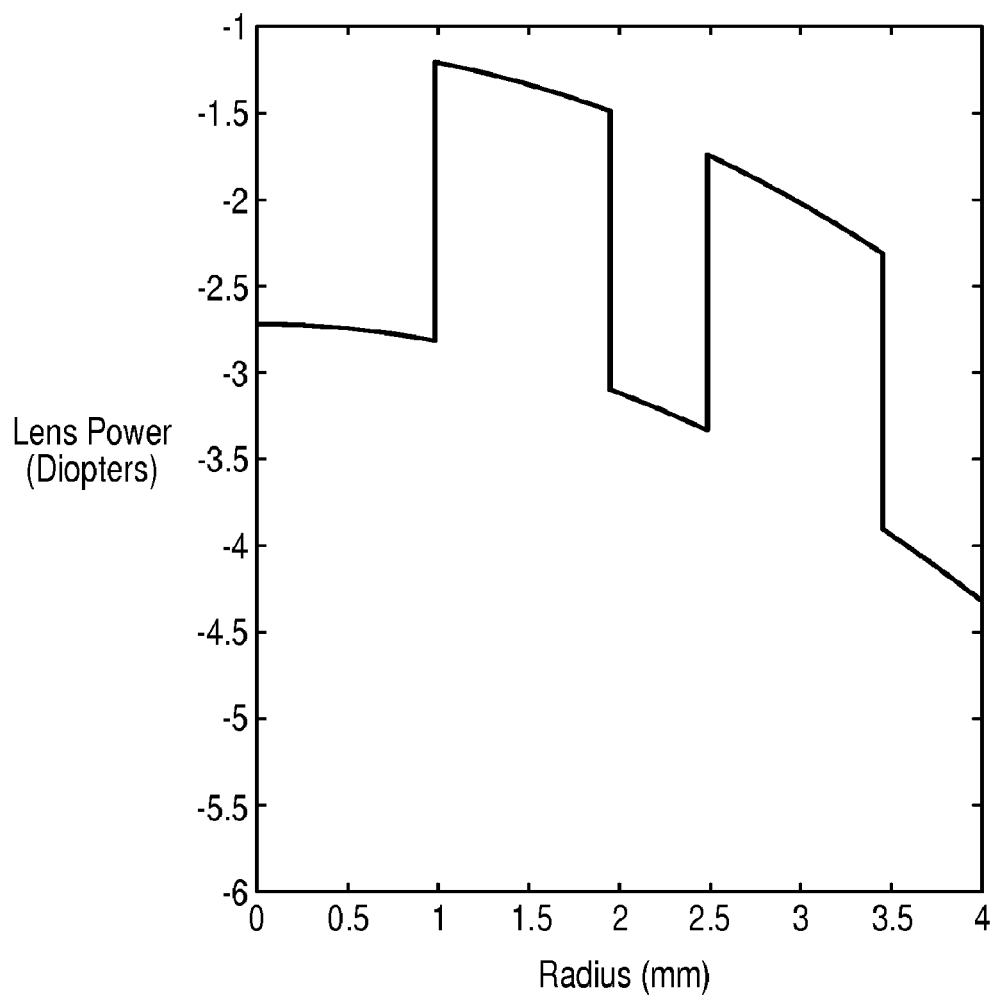
FIG. 4 is a graph in which is depicted a power profile of a lens of the invention.

For purposes of the invention, by "a set of three lenses" is not meant literally only three lenses, but rather three subsets of lenses each of which subsets is composed of multiple lenses that provide sphere power and add power over desired ranges. Preferably, each subset is composed of multiple lenses that provide sphere power over the range of −12.00 to +8.00 diopters in 0.50 diopters increments and add power over the ranges of 0.75 to 2.50 diopters in increments of 0.25 diopters. More preferably, one subset of lenses provides sphere power over the range of −12.00 to +8.00 diopters in 0.50 diopters increments and add power over the ranges of 0.75 to 1.75 diopters in increments of 0.25 diopters, a second subset of lenses provides sphere power over the range of −12.00 to +8.00 diopters in 0.50 diopters increments and add power over the ranges of 0.75 to 2.5o diopters in increments of 0.25 diopters, and a third subset of lenses provides sphere power over the range of −12.00 to +8.00 diopters in 0.50 diopters increments and add power over the ranges of 1.25 to 2.50 diopters in increments of 0.25 diopters, Examples of power profiles for a lens from each of the subsets for a −3.00 diopters sphere prescription are shown in FIGS. 2, 3, and 4. The lenses exemplified by these power profiles also satisfy $d_A > d_B > d_C$ and $n_A < n_B < n_C$. These exemplary lenses may be fit in the pair combinations shown on Table 1 below. For purposes of Table 1, the lens of FIGS. 2, 3, and 4 are designated "A", "B", and "C", respectively. In Table 1, the first letter denominates the lens used in the dominant eye and the second letter is the lens of the non-dominant eye. A "+" sign designates that the non-dominant eye lens is fit with an additional 0.25 diopters of power above that determined by the eye care practitioner as required for the best distance vision correction for the individual.

TABLE 1

| Add Power (diopters) | Combinations |
| --- | --- |
| 0.75 | AA, AB, AA+ |
| 1.00 | AA, AB, AA+ |
| 1.25 | BB, AB., BC, AA+, BB+ |
| 1.50 | BB, AB, BC, AA+, BB+ |
| 1.75 | BC, BB, AB |
| 2.00 | BC, BB+ |

TABLE 1-continued

| Add Power (diopters) | Combinations |
| --- | --- |
| 2.25 | BC |
| 2.50 | BC |

Still more preferably, the invention provides a set of three lenses, each lens having a power profile different from that of each of the other lenses and the lenses satisfying the following relationships:

$$\overline{D} \geq -0.14 \times Rx\_add + 0.84$$

$$\overline{N} \geq -0.08 \times Rx\_add + 0.64$$

$$\overline{\Delta d} \leq 0.2$$

$$\overline{\Delta n} \leq 0.2$$

wherein the front surface, or object side surface, of the lens is a zone multifocal surface or a continuous aspheric multifocal surface and the back surface, or eye side surface, of the lens is an aspheric surface. By "zone multifocal surface" is meant that there is a discontinuity as one moves from one power zone to another power zone. The aspheric back surface preferably has a radius of approximately 7.20 to 8.10 mm and more preferably 7.85 mm, from the geometric center to the lens edge and a conic constant of −0.26.

In a still more preferred embodiment, the front multifocal surface has five, radially symmetric zones that alternate between near correction and distance correction or near, distance and intermediate correction and an aspheric back surface with a radius of approximately 7.20 to 8.10 mm and more preferably 7.85 mm, and a conic constant of −0.26. In Table 2 below provides more preferred values for the set of three lenses, A, B, and C within this embodiment.

TABLE 2

|  | A | B | C |
| --- | --- | --- | --- |
| Nominal Zone Height (diopters) | 0.6 | 0.9 | 1.9 |
| Zone Height Range | 0.3 to 0.8 | 0.7 to 1.2 | 1.7 to 2.1 |
| Spherical Aberration (diopters/mm$^2$) | −0.1 | −0.17 | −0.1 |
| Spherical Aberration Range | −0.08 to −0.12 | −0.14 to −0.20 | −0.8 to −0.12 |
| Zone Transitions-1$^{st}$ | 0.75 | 0.7 | 1 |
| Zone Transitions-1$^{st}$ Range | 0.65 to 0.85 | 0.6 to 0.8 | 0.9 to 1.1 |
| Zone Transitions-2d | 1.25 | 1.3 | 1.95 |
| Zone Transitions-2d Range | 1.15 to 1.35 | 1.2 to 1.4 | 1.85 to 2.05 |
| Zone Transitions-3$^{rd}$ | 2 | 1.95 | 2.5 |
| Zone Transitions-3$^{rd}$ Range | 1.9 to 2.1 | 1.85 to 2.05 | 2.4 to 2.6 |
| Zone Transitions-4$^{th}$ | 2.5 | 2.55 | 3.45 |
| Zone Transitions-4$^{th}$ Range | 2.4 to 2.6 | 2.45 to 2.65 | 3.35 to 2.55 |

In a yet more preferred embodiment, the invention provides a set of three lenses, each lens having a power profile different from that of each of the other lenses and the lenses satisfying the following relationships:

$$\overline{D} \geq -0.14 \times Rx\_add + 0.84$$

$$\overline{N} \geq -0.08 \times Rx\_add + 0.64$$

$$\overline{\Delta d} \leq 0.2$$

$$\overline{\Delta n} \leq 0.2$$

wherein the front surface is a zone multifocal surface in which in each zone is incorporated spherical aberration in which spherical aberration of the near zones may be an additional 0.05 to 0.1 diopters/mm$^2$ from that of the distance zones. Alternatively, whether the multifocal surface is a continuous or discontinuous surface, the spherical aberration for distance and near may be adjusted according to the following equations:

$$SA_{RX}=SA_0+c*Rx\_sphere$$

$$0.0044<c<0.0052$$

wherein $SA_0$ is the spherical aberration of the design for an Rx_sphere that equals 0.0 diopters;

c is a constant of a value between 0.0044 and 0.0052 and preferably is 0.0048.

The back surface of the lens in these embodiments is preferably aspheric with a radius of approximately 7.20 to 8.10 mm, more preferably 7.85 mm and a conic constant of −0.26.

In yet another embodiment of the invention, a set of three lenses is provided, each lens having a power profile different from that of each of the other lenses and the lenses satisfying the following relationships:

$$\overline{D} \geq -0.14 \times Rx\_add+0.84$$

$$\overline{N} \geq -0.08 \times Rx\_add+0.64$$

$$\overline{A}d \leq 0.2$$

$$\overline{A}n \leq 0.2$$

$$STD(P_E(r))<0.15 \text{ for } 1.25<r<3.$$

wherein STD is the standard deviation; and $P_E(r)$ is the effective lens plus—eye power given by the following equation:

$$\_P_E(R) = \int_0^R P(r)*r\,dr \quad \text{(VII)}$$

wherein P(r) is the power of the contact lens on the eye given by Equation II. The additional constraint desensitizes the visual performance of the design to the pupil size.

In the zone designs of the invention, the first zone, or the zone that is centered at the geometric center of the lens may be, and preferably is, a zone that provides distance vision correction or it may provide near or intermediate vision correction. In lens pairs, the first zone may be the same or different. Similarly, in continuous, aspheric multifocal designs, the correction at the center of each of the lens pairs may be the same or different and may be selected from distance, intermediate and near correction.

Contact lenses that may be designed according to the invention preferably are soft contact lenses. Soft contact lenses, made of any material suitable for producing such lenses, preferably are used. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Pat. No. 6,846,892 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

What is claimed is:

1. A set of contact lenses, comprising a first lens having a mean value of a monocular weighted distance ratio $d_A$ and a mean value of a monocular weighted near ratio $n_A$, a second lens having a mean value of a monocular weighted distance ratio $d_B$ and a mean value of a monocular weighted near ratio $n_B$, and a third lens having a mean value of a monocular weighted distance ratio $d_C$ and a mean value of a monocular weighted near ratio $n_C$, wherein each of the first, second and third lenses has a power profile that is different from each of the other lenses and wherein $d_A>d_B>d_C$ and $n_A<n_B<n_C$.

* * * * *